United States Patent
Park

(10) Patent No.: US 11,513,532 B2
(45) Date of Patent: Nov. 29, 2022

(54) METHOD OF MOVING IN POWER ASSIST MODE REFLECTING PHYSICAL CHARACTERISTICS OF USER AND ROBOT IMPLEMENTING THEREOF

(71) Applicant: LG ELECTRONICS INC., Seoul (KR)

(72) Inventor: Hyeri Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 334 days.

(21) Appl. No.: 16/805,260

(22) Filed: Feb. 28, 2020

(65) Prior Publication Data
US 2021/0011484 A1 Jan. 14, 2021

(30) Foreign Application Priority Data
Jul. 10, 2019 (KR) .................... 10-2019-0083496

(51) Int. Cl.
| | |
|---|---|
| G05D 1/02 | (2020.01) |
| B62B 5/00 | (2006.01) |
| B62B 3/00 | (2006.01) |
| G06V 20/10 | (2022.01) |

(Continued)

(52) U.S. Cl.
CPC ............ *G05D 1/0276* (2013.01); *B62B 3/002* (2013.01); *B62B 5/0073* (2013.01); *B62B 5/0096* (2013.01); *G05D 1/0214* (2013.01); *G05D 1/0221* (2013.01); *G06V 20/10* (2022.01); *G06V 40/10* (2022.01); *G06V 40/178* (2022.01)

(58) Field of Classification Search
CPC .. G05D 1/0276; G05D 1/0214; G05D 1/0221; B62B 3/002; B62B 5/0073; B62B 5/0096; G06V 20/10; G06V 40/10; G06V 40/178
See application file for complete search history.

(56) References Cited

U.S. PATENT DOCUMENTS

| 10,956,759 B1* | 3/2021 | Pertsel .............. B60R 21/01552 |
| 2007/0233403 A1* | 10/2007 | Alwan .................. A61B 5/1038 |
| | | 702/33 |

(Continued)

FOREIGN PATENT DOCUMENTS

| JP | 2007-55480 A | 3/2007 |
| KR | 10-2017-0131958 A | 12/2017 |
| KR | 10-2019-0082048 A | 7/2019 |

*Primary Examiner* — Hunter B Lonsberry
*Assistant Examiner* — Harrison Heflin
(74) *Attorney, Agent, or Firm* — Birch, Stewart, Kolasch & Birch, LLP

(57) ABSTRACT

A robot can include a cart to receive one or more objects; a camera sensor to photograph a periphery of the robot and capture an image of a user of the robot; a handle assembly coupled to the cart; a moving part to move the robot; a force sensor to sense a force applied to the handle assembly; and a controller configured to generate physical characteristics information on physical characteristics of the user of the robot based on the image of the user, and adjust at least one of a moving direction of the robot, a moving speed of the moving part and a value of torque applied to a motor of the moving part, based on the physical characteristics information and a magnitude of the force applied to the handle assembly sensed by the force sensor.

18 Claims, 10 Drawing Sheets

(51) Int. Cl.
*G06V 40/10* (2022.01)
*G06V 40/16* (2022.01)

(56) References Cited

U.S. PATENT DOCUMENTS

| | | | | |
|---|---|---|---|---|
| 2007/0289799 | A1* | 12/2007 | Aoki | G06V 20/64 |
| | | | | 180/271 |
| 2013/0200579 | A1* | 8/2013 | Abernethy | B62B 3/001 |
| | | | | 280/6.15 |
| 2015/0332087 | A1* | 11/2015 | Joshi | G06K 9/00 |
| | | | | 382/203 |
| 2016/0016630 | A1* | 1/2016 | Thompson | B62M 6/45 |
| | | | | 74/519 |
| 2017/0001656 | A1* | 1/2017 | Katayama | A61H 3/04 |
| 2017/0344651 | A1* | 11/2017 | Ishido | H04N 1/00204 |
| 2018/0162433 | A1* | 6/2018 | Jones | B62B 5/0036 |
| 2020/0275059 | A1* | 8/2020 | De Bonet | H04N 5/2256 |
| 2021/0053233 | A1* | 2/2021 | Hatayama | G06V 20/10 |
| 2022/0083049 | A1* | 3/2022 | Kawai | B62B 5/0033 |

* cited by examiner

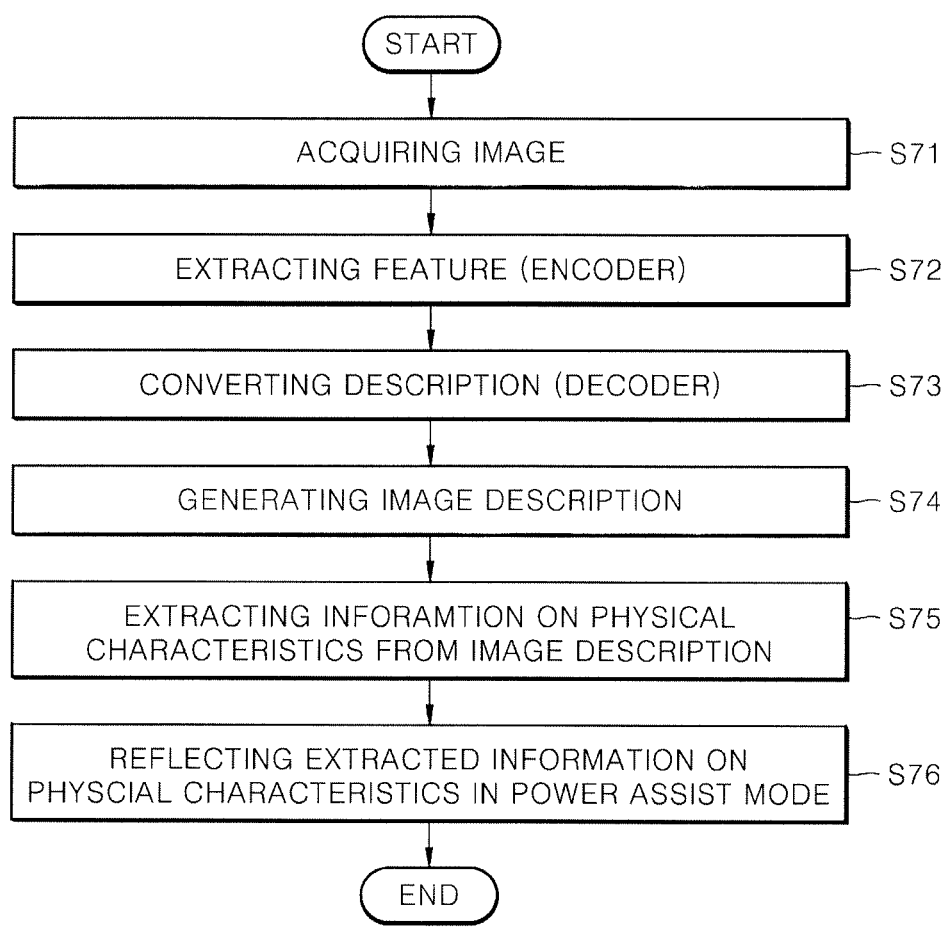

METHOD OF MOVING IN POWER ASSIST MODE REFLECTING PHYSICAL CHARACTERISTICS OF USER AND ROBOT IMPLEMENTING THEREOF

CROSS-REFERENCE TO RELATED APPLICATION

The present disclosure claims priority to and the benefit of Korean Patent Application No. 10-2019-0083496, filed on Jul. 10, 2019, the entirety of which is incorporated herein by reference in its entirety.

BACKGROUND

1. Field of the Invention

A method for moving a robot in a power assist mode by reflecting physical characteristics of a user and the robot implementing such method are disclosed herein.

2. Description of Related Art

In large spaces in which human resources and material resources are actively exchanged, such as large-scale marts, department stores, airports and golf courses, various people can move about while carrying various objects. In this situation, devices, such as carts, can assist users in moving objects, to provide the user with convenience.

Conventionally, the user can directly move the cart by him or herself. The cart can be heavy due to various types of articles loaded in the cart or a weight of the cart. Therefore, there is a growing need for a cart to which electric power is applied and that moves based on control of the user.

In particular, in the above-mentioned large places where a great number of people visit and a lot of goods are moved, a cart can be controlled by the user and can autonomously determine a surrounding situation.

Accordingly, there is a need for development of a cart that is easily moved by the user and can move to meet intentions of the user as well as avoiding collision between the cart and obstacles in the large space. In particular, provided is a method for moving a robot, such as a cart, by reflecting the physical characteristics of the user, to move the robot to meet an intention of the user.

SUMMARY OF THE INVENTION

In the present disclosure, a technology is provided in which force applied to a robot by the user can be assisted by electric energy, thereby allowing the user to easily move the cart.

Further, in the present disclosure, a technology is provided in which the robot can move based on changes in force, for example, magnitude of force or a difference in forces, and the like, which is applied to a handle assembly by the user so that the user can control movement of the robot.

Further, in the present disclosure, a technology is provided in which a speed of moving or a direction of moving of the robot can be changed, even when a same magnitude of power is applied, based on image information to determine physical characteristics of the user and by reflecting a difference.

The objects of the present disclosure are not limited to the above-mentioned description. Other features that have not been mentioned can be understood from the following description and can be more clearly understood from the disclosed embodiments. Further, it will be understood that embodiments can be realized via various means and combination thereof that are described in the appended claims.

According to an embodiment of the present disclosure, the robot that moves in the power assist mode by reflecting the physical characteristics of the user generates the information on the physical characteristics of the user based on the image information of the user using the robot, where the image is photographed by the camera sensor and can control a moving direction or a moving speed of a moving part or a value of torque applied to a motor of the moving part based on the information on the physical characteristics and a magnitude of the force sensed by a force sensor.

According to an embodiment of the present disclosure, a controller of the robot that moves in the power assist mode by reflecting the physical characteristics of the user can control, when the robot is controlled, the camera sensor to photograph the user near the handle assembly, and the controller can extract information on gender of the user based on the photographed image and can generate the information on the physical characteristics.

According to an embodiment of the present disclosure, the camera sensor of the robot that moves in the power assist mode by reflecting the physical characteristics of the user can photograph an image of an article disposed in the receiving portion of the robot, and the controller can extract the information on the gender of the user from the image of the article and can update the information on the physical characteristics.

According to an embodiment of the present disclosure, the controller of the robot that moves in the power assist mode by reflecting the physical characteristics of the user can further include an artificial intelligence processor that receives the image photographed by the camera sensor and generates description information about the image. The artificial intelligence processor can output information on the gender or the age of the person in the image, or the artificial intelligence processor can output the relation of the article included in the image with respect to the gender of the user.

According to an embodiment of the present disclosure, a method for moving a robot in a power assist mode by reflecting physical characteristics of the user can include photographing, by a camera sensor of a robot, a periphery of a handle assembly at a time point at which the robot moves, generating, by a controller of the robot, information on the physical characteristics by generating information on the physical characteristics of the user, and controlling, by the controller, a moving direction or a moving speed of the moving part or a value of torque applied to a motor of the moving part based on a magnitude of a force sensed by a force sensor that senses a force applied to the handle assembly and the information on the physical characteristics.

An embodiment includes a robot having a cart sized to receive one or more objects, a moving part configured to move the robot, a handle assembly coupled to the cart, a camera sensor configured to photograph a periphery of the robot, a force sensor configured to sense a force applied to the handle assembly, and a controller configured to generate information on physical characteristics of the user of the robot based on information on an image of the user, in which the image is photographed by the camera sensor, and control a moving direction or a moving speed of the moving part or a value of torque applied to a motor of the moving part based on the information on the physical characteristics and a magnitude of the force sensed by the force sensor.

When embodiments of the present disclosure are applied, force applied to a robot by the user can be assisted by electric energy, so that the user can easily move the robot.

When embodiments of the present disclosure are applied, the cart can be moved based on the physical characteristics of the user or by reflecting changes in force, for example, a difference in magnitude of the force applied to the handle assembly, to control movement of the robot.

When embodiments of the present disclosure are applied, even when the same magnitude of force is applied, the moving speed of the moving direction of the cart can be changed by determining the physical characteristics of the user using the image information and based on a difference in the forces of the users.

The effects of the present disclosure are not limited to the effects described above, and those skilled in the art of the present disclosure can readily understand various effects obtained by the present disclosure based on the specific description of the disclosure.

BRIEF DESCRIPTION OF THE DRAWINGS

FIG. 10 shows a process in which an artificial intelligence processor generates description information on an image after an image is acquired according to an embodiment of the present disclosure.

DETAILED DESCRIPTION OF THE EMBODIMENTS

Figure 1:
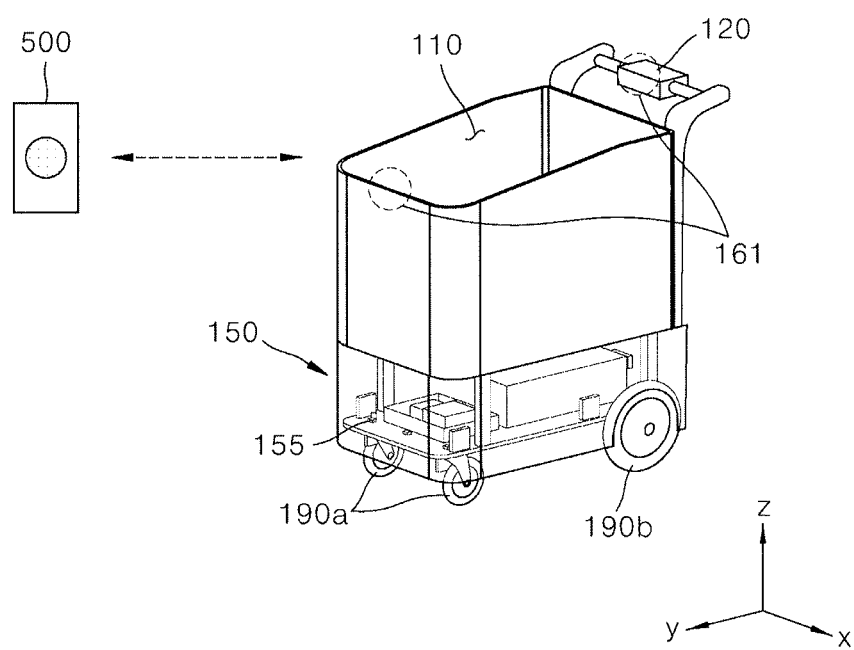
FIG. 1 shows a cart according to an embodiment of the present disclosure.

Hereinafter, embodiments of the present disclosure will be described in detail with reference to drawings so that those skilled in the art to which the present disclosure pertains can easily implement the present disclosure. The present disclosure can be implemented in many different manners and is not limited to the embodiments described herein.

In order to clearly illustrate the present disclosure, technical explanation that is not directly related to the present disclosure can be omitted, and same or similar components are denoted by a same reference numeral throughout the specification. Further, some embodiments of the present disclosure will be described in detail with reference to the drawings. In adding reference numerals to components of each drawing, the same components can have the same reference numeral as possible even when they are displayed on different drawings. Further, in describing the present disclosure, a detailed description of related known configurations and functions will be omitted when it is determined that it can obscure the gist of the present disclosure.

In describing components of the present disclosure, it is possible to use the terms such as first, second, A, B, (a), and (b), etc. These terms are only intended to distinguish a component from another component, and a nature, an order, a sequence, or the number of the corresponding components are not limited by that term. When a component is described as being "connected," "coupled," or "connected" to another component, the component can be directly connected or able to be connected to the other component; however, it is also to be understood that an additional component can be "interposed" between the two components, or the two components can be "connected," "coupled" or "connected" through an additional component.

Further, with respect to implementation of the present disclosure, the present disclosure can be described by sub-dividing an individual component; however, the components of the present disclosure can be implemented within a device or a module, or a component of the present disclosure can be implemented by being divided into a plurality of devices or modules.

Hereinafter, devices like robot that follow the user and move autonomously or move based on electrical energy under the control of the user are referred to as "a smart cart-robot," "a cart-robot," "a robot" or "a cart." The embodiments of the present disclosure can be implemented on devices like robot. For convenience of explanation, the present disclosure can be described based on cart, and the described embodiments are embodiment of robot. The cart or the robot can be used in stores such as large marts and department stores. Alternatively, users can use the robot in a space where many travelers move, such as airports or harbors. Robots can also be used in leisure spaces such as golf courses.

Further, the cart, or the robot includes all types of apparatuses that track position of the user to follow the user and have a predetermined storage space. The cart or the robot includes all types of devices that move based on the electric power under the control of a user, for example, pushing or pulling. As a result, the user can move the cart or the robot without adjusting it. The user can also move the cart or robot with a less magnitude of force.

In particular, in the present disclosure, the robot moves based on the electrical power under on the control of the user. The robot can analyze the force controlled by the user to adjust the moving speed and the moving direction of the cart or can perform a function for moving and stopping the robot.

Figure 2:
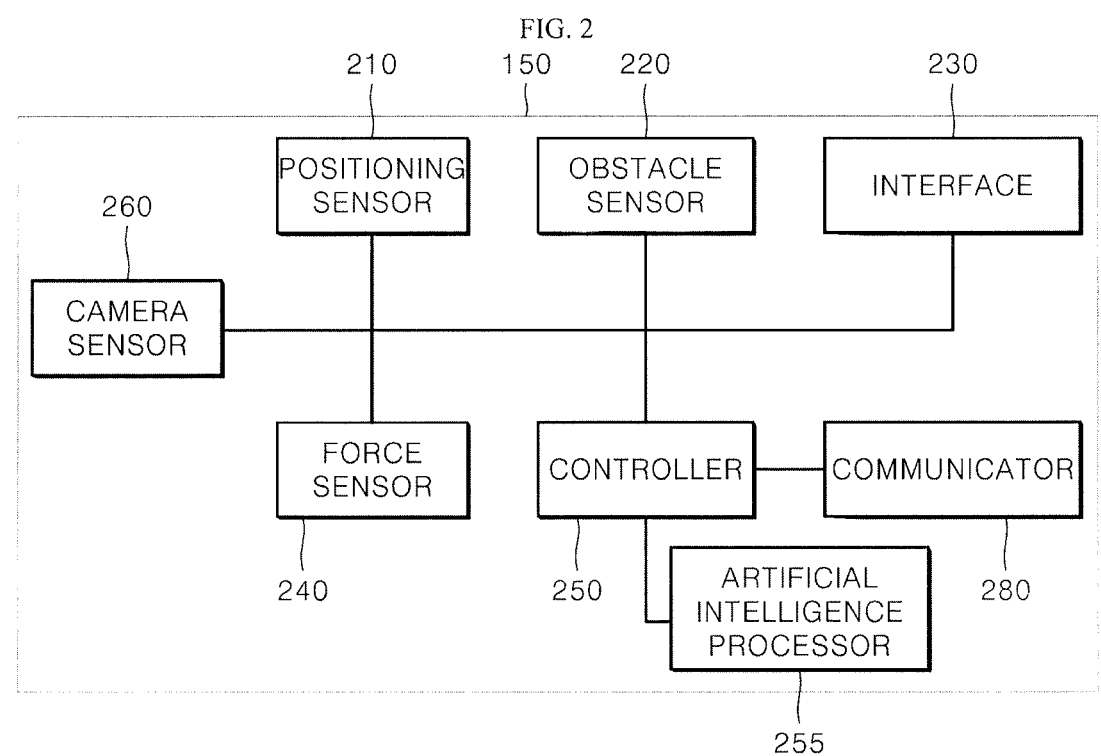
FIG. 2 shows a detailed configuration of a control module of a robot according to an embodiment of the present disclosure.

FIG. 1 shows appearance of a robot according to an embodiment of the present disclosure. FIG. 2 is a detailed configuration of a control module 120 of a robot according to an embodiment of the present disclosure.

A robot 100 includes a receiving portion (storage portion) 110, a handle assembly 120, a control module 150, and moving parts 190a and 190b (e.g., wheels). The object is stored or loaded, by the user, in the receiving portion 110. The handle assembly 120 enables a user to manually control the movement of the robot 100 or to semi-automatically control the movement of the robot 100. The embodiments of the present disclosure, the robot can comprise a cart. The embodiments of the present disclosure, the robot can be combined with a cart. The embodiments of the present disclosure, the cart can move automatically or semi-automatically, and it can be implemented as a robot.

The handle assembly 120 is disposed on one surface of the robot and senses, when the user applies the force during controlling of the robot 100, the force applied by the user. The control module 150 controls the movement of the robot 100. The control module 150 determines a direction, speed, and the like of movement of the robot and moves a moving part 190, based on the force sensed by the handle assembly 120. Accordingly, the user can push the robot 100 forward and rearward or can change the direction of the robot 100 using the handle assembly 120. The control module 150 controls the movement of the robot 100.

The control module 150 controls the autonomous travelling of the robot 100 to follow the user, using a transmission module 500, in the autonomous mode. Further, the control module 150 assists the user in pushing or pulling the robot with a less magnitude of force in the power assist mode to control semi-autonomous travelling (the power assist) in which the robot travels.

Therefore, when the user applies the force to the handle assembly 120 to control the robot, a force sensor 240 senses the force applied to the handle assembly 120. The force sensor 240 can sense a magnitude of force applied to the handle assembly 120 or changes in the forces in a time of unit. The force sensor 240 is disposed in the handle assembly 120. A controller 250 of the control module 150 determines a magnitude, a direction of the force, and an increasing speed of the force sensed by the force sensor 240. That is, the force sensor 240 is physically disposed in the handle assembly 120 and logically interacts with the controller 250 of the control module 150.

The handle assembly 120 can include an interface that outputs predetermined information to the user. The interface 230 can also be controlled by the control module 150. The interface 230 can show the user a method for controlling the robot 100 and the handle assembly 120. Alternatively, the interface 230 can output a warning message to the user during controlling of the cart robot 100 and the handle assembly 120.

An obstacle sensor 220 that senses an obstacle provided around the robot can be provided in a particular area of the robot 100. The obstacle sensor 220 can be provided in various areas such as an upper end, a lower end, and the like of the robot 100. For example, a plurality of obstacle sensors 220 can be provided in an area indicated by reference numeral 155 to sense obstacles placed at a front side, a rear side, a left side, and a right side, of the cart.

In an embodiment, the obstacle sensor can be placed on the front surface/both lateral surfaces of the robot in a direction where the robot 100 moves. Alternatively, when the robot 100 moves rearward, the obstacle sensor can be placed on a front surface, a rear surface, and both sides of the robot.

Further, a positioning sensor 210 that tracks a position of a user to follow a user can be disposed in various areas of the robot 100. The positioning sensor 210 can detect the transmission module 500 that outputs a specific signal.

That is, the robot 100 can be remotely placed and can identify a predetermined position of the transmission module 500 carried by the user and can move while following the user. The robot 100 can optionally perform a function for identifying the position of the user and following the user.

The moving part 190 moves the robot based on control of the controller. Further, the moving part 190 can move the robot along a predetermined path formed by the controller 250. The controller 250 can determine a state in which the robot 100 moves via movement of the moving part 190 based on speed of rotation of wheels, the number of rotation of wheels, a direction of rotation of wheels, and the like. The moving part 190 can include a predetermined brake, and the controller 250 can control the brake of the moving part 190 to stop a moving robot 100.

In addition, the controller 250 can check horizontality of the wheels that are included in the moving part 190 and can identify whether the robot 100 is on a slope or on a flatland. In another embodiment, the controller 250 can identify whether the robot is on a slope or on the flatland, using a horizontality sensor.

The force sensor 240 is placed in the handle assembly 120 and senses, when the user applies the force to the handle assembly 120, a magnitude of the force or changes in the force applied by the user.

The force sensor 240 includes various types of sensors, for example, a hall sensor, a magnetic-type sensor, and a button-type sensor.

The control module 150 can control the moving parts 190*a* and 190*b*. The moving part 190 moves the robot along the moving path formed by the controller 250. The moving part 190 can move the robot 100 by rotating the wheels included in the moving part 190. The controller 250 can identify the position of the robot 100 based on a rotating speed and a number of rotations, and a direction, of the wheel, through the movement of the robot by the moving part 190. An angular speed applied to a left wheel and a right wheel of the robot is provided, in the moving path formed by the controller 250.

As shown in FIG. 2, the control module 150 includes logical components, for example, the positioning sensor 210, the force sensor 240, the obstacle sensor 220, the interface 230, the controller 250, the camera sensor 260, and a communicator 280.

The obstacle sensor 220 senses an obstacle provided near the robot. The obstacle sensor 220 can sense a distance between the robot and a person, a wall, an object, a fixed object, an installed object, and the like.

The positioning sensor 210 is used for the robot that supports autonomous traveling. However, in a robot that supports only semi-autonomous traveling (power assist), the positioning sensor 210 can be selectively disposed or not.

The positioning sensor 210 can track a position of a user who carries a transmission module 500 and can be disposed at an upper side, a lateral side, and the like of the robot 100. However, the positions of these sensors can change in various manners and the present disclosure is not limited thereto. Regardless of the positions of the sensors, the control module 150 controls the sensors or uses information sensed by the sensors. That is, the sensors are logical elements of the control module 150 regardless of the physical positions of the sensors.

The positioning sensor 210 receives a signal from the transmission module 500 and measures the position of the transmission module 500. When the positioning sensor 210 uses ultra-wideband (UWB), a user can carry a transmission module 500 that transmits a predetermined signal to the positioning sensor 210. The positioning sensor 210 can identify the position of the user based on the position of the transmission module 500. For example, the user can carry a transmission module 500 having a form of a band worn on a wrist.

An interface that outputs predetermined information to a user can also be disposed in the handle assembly 120, and the interface is controlled by the control module 150. The handle assembly 120 includes the force sensor 240 that senses a force with which a user pushes or pulls the robot.

The force sensor 240 can be disposed inside or outside of the robot 100 which is subjected to change of a force by operation of the handle assembly 120. The position or configuration of the force sensor 240 is not particularly limited, and the embodiment of the present disclosure is not limited to any specific force sensor 240.

The force sensor 240 is disposed in the handle assembly 120 or is disposed inside or outside of the robot 100 connected to the handle assembly 120. When a user applies a force to the handle assembly 120, the force sensor 240 senses the magnitude of a force, change of a force, and the like. The force sensor 240 includes various types of sensors such as a Hall sensor, a magnetic type sensor, and a button type sensor. The force sensor 240 can include a left force sensor and a right force sensor and the left force sensor and the right force sensor can be disposed inside or outside of the handle assembly 120 or the robot 100, respectively.

The obstacle sensor 220 senses an obstacle near the robot. The obstacle sensor includes a sensor that measures a distance or acquires an image and identifies an obstacle in the image. In an embodiment, obstacle sensor 220 that measures the distance includes an infrared sensor, an ultrasonic sensor, and a LIDAR sensor.

Further, the obstacle sensor 220 includes a depth sensor or an RGB sensor. The RGB sensor can sense an obstacle and an installed object in an image. The depth sensor can generate depth information for each position in an image.

Further, the obstacle sensor 220 includes a time-of-flight (TOF) sensor.

The controller 250 cumulatively stores position information of a transmission module 500 and generates a moving route corresponding to the stored position information of the transmission module. In order to cumulatively store the position information, the controller 250 can store the position information of the transmission module 500 and the robot 100 as information on absolute position (absolute coordinates) based on a predetermined reference point.

Alternatively, the controller 250 can control movement of the robot using the obstacle sensor 220 and the camera sensor 260. Particularly, the camera sensor 260 can be disposed in an area indicated by reference numeral 161 in FIG. 1, and can photograph the user or the receiving portion 110.

The controller 250 can determine the physical characteristics of the user who controls the robot 100 by analyzing the image of the user. Physical characteristics refer to at least one of the user's gender, age, a height, or a weight, and the like, to control the robot 100.

By analyzing the photographed image, the controller 250 can provide the moving part (e.g., wheels) with the power based on to a force applied to the handle assembly.

Further, the controller 250 controls the moving direction or the moving speed of the moving part based on the change or magnitude of a force sensed by the force sensor 240. Alternatively, the controller 250 can control the moving part 190 such that a lot of magnitude of electric energy is supplied to a motor of the moving part to control the moving speed of the moving part.

Further, the controller 250 detects the installed object near the robot using a value sensed by the obstacle sensor 220. The controller 250 can determine an installed object using the obstacle sensor 220 disposed at lateral side and a front side of the robot.

Further, the controller 250 of the robot 100 can determine the gender of the user according to types of goods included in the receiving portion 110 by photographing, by the camera sensor 260, the receiving portion 110. Accordingly, it is possible to adjust a range to transmit the power to the moving part in the power assist mode.

Meanwhile, the controller 250 of the robot 100 can additionally mount the artificial intelligence processor 255. When information on the image photographed by the camera sensor 260 is provided to the controller 250, the artificial intelligence processor 255 in the controller 250 receives the provided information and can determine the gender of the user and can identify whether the user is an elderly person or a child, or the user has a greater magnitude of force or less magnitude of force. In an embodiment, the artificial intelligence processor can perform operation based on machine learning or deep learning network.

The controller 250 of the robot can perform context awareness using the artificial intelligence processor. Similarly, the controller 250 can determine the situation of the robot 100 using the sensed values, the control of the user, or information received from other robots or the server, as input values of the artificial intelligence processor.

In particular, the robot 100 can input, to the artificial intelligence processor of the controller 250, various kinds of image data generated by the camera sensor 260 that determines a range of power transmission in the power assist mode or the speed control of the moving part according to the user, thereby generating an accurate result of determination.

In other words, the controller 250 of the robot can read the input image information using the artificial intelligence processor. Further, the controller 250 can perform image processing.

The above-mentioned artificial intelligence processor can include an inference engine, a neural network, and a probability model. The artificial intelligence processor can perform supervised learning or unsupervised learning based on various kinds of data.

Further, the artificial intelligence processor can recognize voice of the user, received by the interface 230 and can extract the information on the physical characteristics, for example, gender of the user and the old and the weak from the voice of the user, to perform natural language processing.

Further, the controller 250 of the robot 100 provides a function for a voice recognition and a text-to-speech (TTS).

In addition, the robot 100 can include a battery that supplies power to the moving part 190, the handle assembly 120, and the control module 150. The battery provides the force that the moving part 190 moves the robot, by the control module 150.

The force that the user pushes the robot is similar to the force that may not move the robot in the absence of electric force or the force that moves the robot at very slow speed. However, in embodiments of the present disclosure, the controller 250 can map a speed or a direction of movement of the robot with respect to the force that the user pushes the robot, in power-assist mode. Accordingly, the user can move the robot with a less magnitude of force.

In particular, the controller 250 can check the characteristics of the user, in particular, the physical characteristics of the user using the camera sensor 260 and the interface 230, and can provide a power assist mode based on the physical characteristics of the user.

That is, the controller 250 generates the information on the physical characteristics of the user based on the image information of the user who uses the robot photographed by the camera sensor 260. The controller 250 can use the information on the physical characteristics and the magnitude of the force sensed by the force sensor 240 to control a moving direction or a moving speed of the moving part 190 or a value of a torque applied to the motor of the moving part 190. As a result, the moving speed or the moving direction of the robot or the magnitude of the force of electrical energy applied to the moving part can be adjusted based on the information on the physical characteristics of the user (information on physical characteristic on gender, age, a height or a shoulder width).

The controller 250 classifies the user into any one of at least two groups. The first group is the H-Power (High Power) group and is a group of user who has a greater magnitude of force, among the users who uses the robot 100. When the user is identified as a male, a tall person or a young person, the controller 250 sets the user to be in the H-Power group.

The second group belongs to a low power (L-Power) group and is a group of user who has a less magnitude of force, among users who use the robot 100. The controller 250 sets, when the user is identified as a woman, a short person, or an elderly person, the user to be in the L-Power group.

Of course, as two groups of user groups are provided, the controller 250 can store a plurality of groups and can identify the user and can set the user to be in a particular group. For example, when a third group belongs to a M-Power (Middle Power) group and determines the user having a middle magnitude of force when the gender, the height of the user is not determined or whether the user is elderly person or young person is not identified, it is determined that the user has the middle magnitude of force and the user is set to be in the M-Power group.

Tables 1 and 2 respectively show moving speeds of carts for each mode according to a magnitude of force applied, by the user, to the handle assembly according to groups to which the user belongs.

In Tables 1 and 2, the moving speed of the cart in which the electric energy is not transmitted to the power is proportional to the force of the user and is slower than the moving speed of the cart in the power assist mode. That is, the robot can use the electric energy as the power in the power assist mode and the user can move the robot faster with a less magnitude of force.

As shown in Table 1, when the magnitude of the force of the user in the H-Power group is double from 5 to 10, speed of movement of the robot is doubled from 10 cm/sec to 20 cm/sec without electric energy. In power-assist mode, the controller 250 can control mapping of the force and speed of movement of the robot based on a set point of the H-Power group, when the magnitude of the force of the user in the H-Power group is 5 o 10 in the power assist mode. As a result, when sensed magnitude of the force is 5, speed of movement of the robot is mapped as 30 cm/sec while when sensed magnitude of the force is 10, the speed of the movement of the robot is mapped as 50 cm/sec. Mapping can be adjusted in various manners in power-assist mode with respect to the force applied to the robot, and a speed or direction of movement of the robot.

TABLE 1

| FORCE APPLIED BY USER IN H-POWER GROUP | SPEED OF MOVEMENT OF ROBOT WITHOUT ELECTRIC ENERGY | SPEED OF MOVEMENT OF ROBOT IN POWER-ASSIST MODE |
|---|---|---|
| 5 | 10 cm/sec | 30 cm/sec |
| 10 | 20 cm/sec | 50 cm/sec |

Similarly, as shown in Table 2, when the magnitude of the user in the L-Power group is doubled from 4 to 8, the moving speed of the robot is doubled from 8 cm/sec to 16 cm/sec without electric energy. On the other hand, in the power assist mode, when the magnitude of the power of the user in the L-Power group is 4 or 8, the controller 250 can adjust the mapping of the force and the moving speed of the robot based on the set point of the L-Power group. As a result, when the sensed magnitude of force is 4, the movement speed of the robot is 30 cm/sec, while when the sensed magnitude of the force is 8, the movement speed of the robot is mapped as 50 cm/sec. The mapping of moving speeds or directions of the force and the robot is controlled in various manners in the power assist mode.

TABLE 2

| FORCE APPLIED BY USER IN L-POWER GROUP | SPEED OF MOVEMENT OF -ROBOT WITHOUT ELECTRICITY | SPEED OF MOVEMENT OF ROBOT IN POWER-ASSIST MODE |
|---|---|---|
| 4 | 8 cm/sec | 30 cm/sec |
| 8 | 16 cm/sec | 50 cm/sec |

As shown in Tables 1 and 2, even when users belonging to different groups move the robot with different magnitude of forces (5 or 4), the moving speed of the robot in the power assist mode is controlled in the same manner. As a result, a user with a weak force can easily adjust the robot 100 in the power assist mode.

The controller 250 can adjust the magnitude of the power to be applied to the moving parts 190a and 190b to map the moving speed of the robot 100 in the power assist mode for each group.

Figure 3:
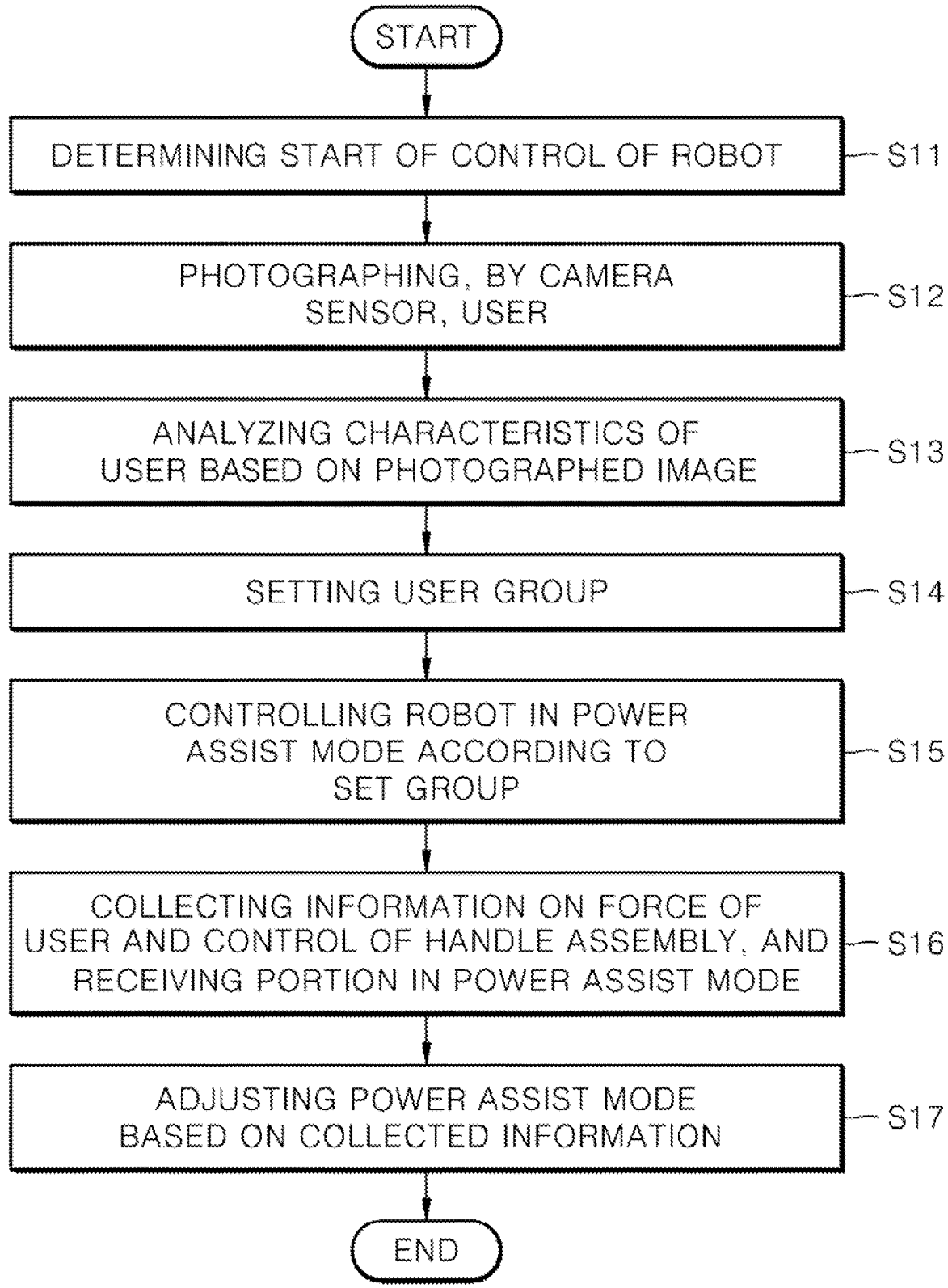
FIG. 3 shows a process of adjusting, by a robot, a power assist mode by determining physical characteristic of a user, using a camera sensor, according to an embodiment of the present disclosure.

FIG. 3 shows a process of adjusting a power assist mode by determining physical characteristics of a user who uses a camera sensor by a robot according to an embodiment of the present disclosure. A controller 250 of the robot determines that the user has started controlling the robot (S11). An embodiment in which the transmission module 500 is separated from the robot or the user controls the interface 230 of the robot to start using the robot 100 or the robot 100 moves by an external force corresponds to S11.

Figure 4:
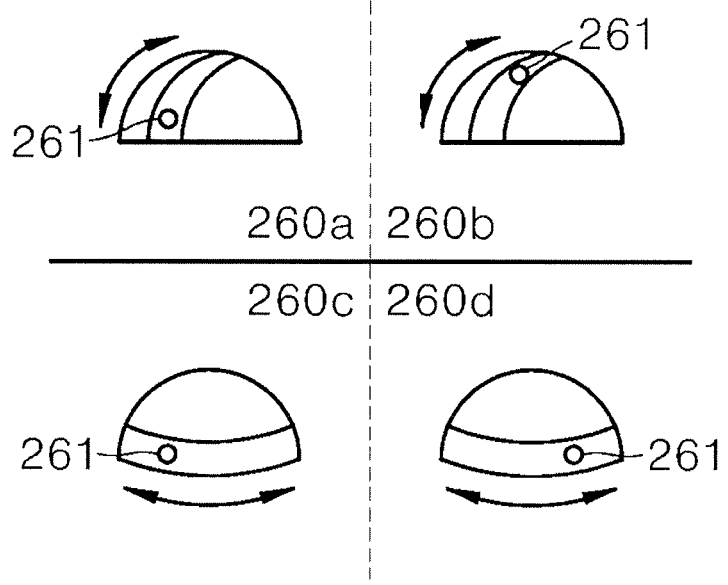
FIG. 4 shows a configuration of a camera sensor according to an embodiment of the present disclosure.

The controller 250 controls the camera sensor 260 to photograph the user. As shown in FIG. 4, a lens 261 of the camera sensor 260 can be rotated vertically or laterally, thereby photographing a user who controls the robot 100.

The controller 250 analyzes the characteristics of the user based on the photographed image (S13). The characteristics of the user are determined by checking the gender or age of the user, the physical characteristics of the user (a height, a shoulder width, and the like) of the user and which group the user belongs, among a plurality of user groups (the H-Power group and the L-Power group).

The controller 250 sets a user group based on a result of determination (S14). Further, the controller 250 controls the robot in the power assist mode according to the set group (S15). As shown in Table 1 or Table 2, the moving speed of the robot in the power assist mode corresponding to the force applied by the user can be different according to the group set by the user. The controller 250 can adjust the electric force applied to the moving part 190 of the robot 100.

The controller 250 collects information on the force of the user, the control of the handle assembly 120, and the receiving portion 110 in the power assist mode (S16). Further, the controller 250 adjusts the power assist mode based on the collected information.

The above-mentioned operation is performed to adjust the user group when the force of the user is different from a range of the force in the set group of the user during operation of the robot in the power assist mode or an article stored, by the user, in the receiving portion 110 is different from the group of the user.

In one embodiment, the artificial intelligence processor included in the controller 250 can check the characteristics of the user through the type of the article the user desires to purchase, based on the image of the article stored in the receiving portion 110. For example, the controller 250 can adjust the characteristics of the user based on the article included in the receiving portion 110 when the data on the article preferred by the user based on age of the user and an article preferred by the user based on gender of the user is accumulated. As a result, as a result of initially photographing the user, when the user is determined to be a woman, but the user is determined as a man based on the stored article, the power assist mode can be adjusted to be suitable for the user.

Meanwhile, when the user is identified as the user in the young age but the user is identified as a senior citizen based on the stored article, the power assist mode can be adjusted to be suitable for the user.

However, S16 can be selectively applied by the controller 250. When operation to change the speed or the direction of the robot 100 moved by the user is frequently performed during controlling of the handle assembly by the user, the controller 250 can determine the characteristics of the user based on the article of the receiving portion 110 to additionally determine the characteristics of the user.

FIG. 4 shows a configuration of a camera sensor according to an embodiment of the present disclosure. A camera sensor 260 can include one or more lenses 261. A camera sensor 260 can rotate the lens 261 to photograph the user at a time when the use of the robot 100 starts.

That is, when the control is started while the robot 100 is stopped, for example, as the handle assembly of the robot 100 is operated, the controller 250 controls the camera sensor to photograph the user in the direction of the handle assembly. In this situation, when many people are photographed, the controller 250 can set a nearest person as the user.

Further, the camera sensor 260 can rotate the lens 261 toward the receiving portion 110 to check the article of the receiving portion 110. In an embodiment, the lens 251 vertically rotates in reference numerals 260a and 260b. In an embodiment, the lens 261 laterally rotates in reference numerals 260c and 260d.

In particular, the controller 250 can instruct the camera sensor 260 to be toward a direction to be photographed to identify the user around the handle assembly 120, thereby accurately determining the characteristics of the user during the rotation of the camera lens 261.

The camera sensor 260 uses a rotatable lens 261 installed at the upper end of the robot, for example, the handle assembly 120 or an area of the receiving portion 110 (area indicated by reference numeral 161 in FIG. 1). When the user starts to control the robot in the power assist mode, the camera sensor 260 can photograph the user and the controller 250 can determine the gender based on the photographed image.

Further to the embodiment shown in FIG. 4, the embodiment of the present disclosure includes a situation in which the lens 261 does not rotate but the camera sensor rotates.

When the embodiments of the present disclosure are applied, the user can easily control the robot according to the body characteristics with respect to the gender and the age during using of the robot having a function of power assist. For example, women/older users are more likely to have less magnitude of power than men/younger users.

Therefore, when the user who has a less magnitude of force operates the robot in the power assist mode during controlling of the robot, the controller 250 can increase the magnitude of electrical energy applied to the moving part 190 to implement the power assist mode, or can increase the moving speed of the moving part 190.

In an embodiment, the controller 250 sets a group to which the user belongs according to gender or age, and accordingly, the controller 250 sets a value of different torque used for the motor of the moving part 190. As a result, the controller 250 controls the robot 100 to efficiently operate in the power assist mode according to the user group by varying the value of the torque applied to the motor according to the user group in the power assist mode.

The group of users can be determined based on the gender, physical characteristics (e.g., the height, the shoulder width, grip, and the like), or age, or the magnitude of force applied during controlling of the robot. Further, the controller 250 can change the determined user group. Using such a mechanism, the controller 250 can set the power assist mode of the robot differently according to various force characteristics of force or physical characteristics of the user, thereby efficiently controlling the robot by reflecting the characteristics of the user.

Table 1 and Table 2 respectively show examples of setting a conversion value of a force in the power assist mode according to the group of the user. This conversion value can then be changed during the control by the user. According to an embodiment, one of two groups is converted to another group or the range of the converted value is changed.

According to an embodiment, the magnitudes of torque (Cart_Torque) to be applied to the motor of the moving part of the robot can be set differently, as shown in Algorithm 1, based on the magnitudes of forces applied by the user in the H-Power group and the user in the L-Power group.

[Algorithm 1]
If User_Group is H_Power_Group
then Cart_Torque=F1*H_gain
else Cart_Torque=F1*L_gain Different values, such as H_gain/L_gain, can be used to set the magnitude of the torque of the motor of the robot according to the user_group, which is a group of users. L_gain can have a value greater than that of H_gain.

Of course, further to the magnitude of the torque, the controller 250 can convert the speed as shown in Tables 1 and 2 above according to the group of the user.

Further, the values of the H_gian/L_gain set as Algorithm 1 can also increase or decrease during controlling of the robot by the user. The above-mentioned matter is described in detail in FIG. 5.

Figure 5:
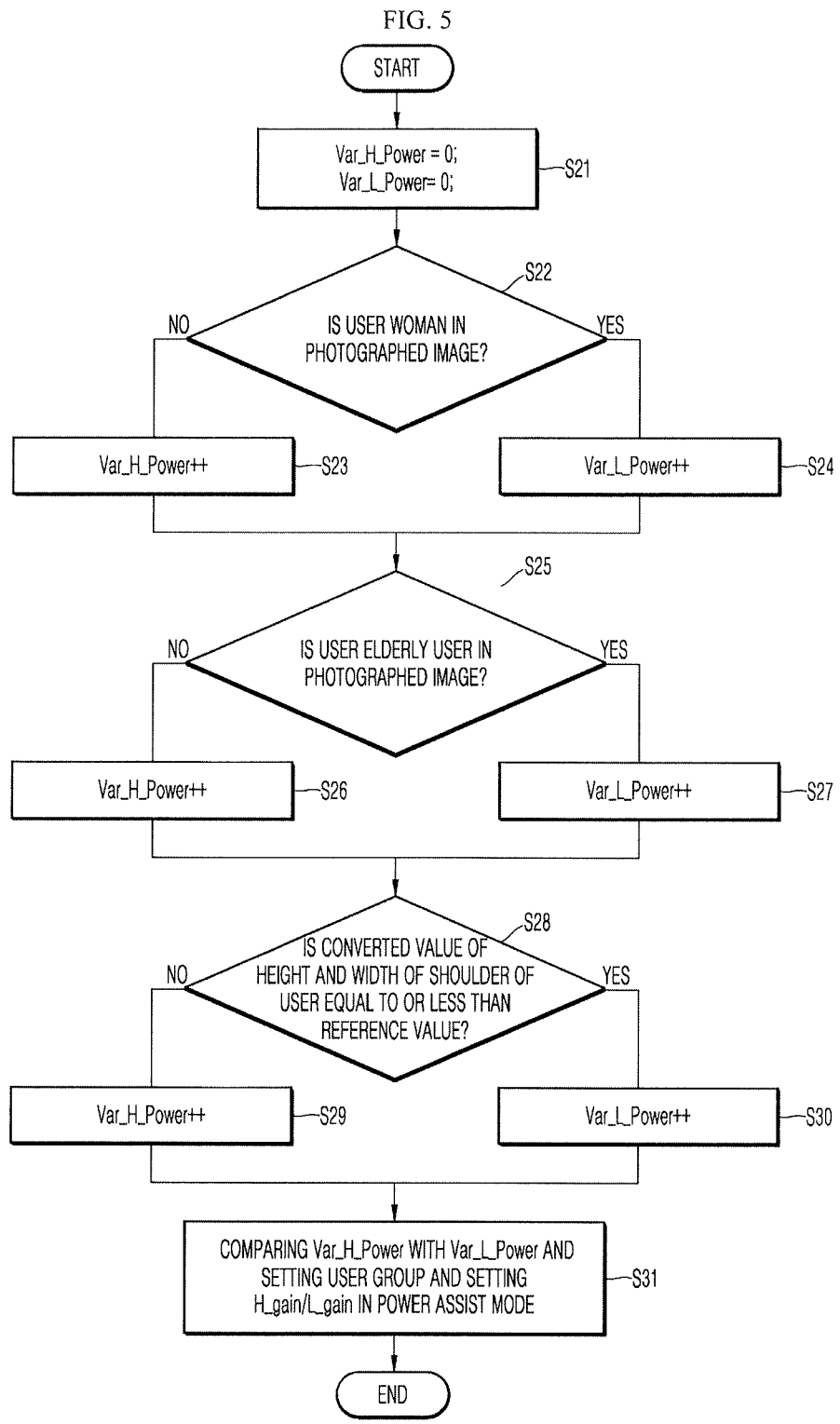
FIG. 5 shows a process of determining groups of users by photographing an image of a user according to an embodiment of the present disclosure.

FIG. 5 shows a process of determining a group of users by photographing a user image according to an embodiment of the present disclosure. FIG. 5 corresponds to a detailed embodiment of processes in S13 and S14.

First, a controller 250 initializes values of variables, for example, Var_H_Power and Var_L_Power to 0 to determine group of users (S21). A gender of the user is determined based on a photographed image of the user (S22). Information on gender of the user can be extracted to generate information on physical characteristics of the user based on an image photographed by performing image recognition by an artificial intelligence processor in the controller 250. As a result, when the user is woman, a magnitude of Var_L_Power is increased by 1 (S24). When the user is not a woman, a magnitude of Var_H_Power is increased by 1 (S23).

Further, the controller 250 determines age of the user based on the photographed image of the user (S25). The artificial intelligence processor in the controller 250 can perform the image recognition and output information on age. For example, the controller 250 generates information on the age based on color of hair and feature of face of the user based on the photographed image, to generate the information on the physical characteristics of the user. As a result, when the user is an elderly user, the magnitude of Var_L_Power is increased by 1 (S27). When the user is not an elderly user, the magnitude of Var_H_Power is increased by 1 (S26).

Further, the controller 250 generates information on a height (a height) and information on a shoulder width (a length between a left side of the shoulder and a right side of the shoulder) of the user based on the photographed image of the user. In more detail, the controller 250 determines whether the value converted from the height and the width of the shoulder of the user is equal to or less than a reference value (S28). For example, the controller 250 can generate the result in various ways, for example, using a value multiplied by converting the height and the width of the shoulder to cm, or a value in which the height and the width of the shoulder are added, or a value calculated by multiplying the height and the width of the shoulder by a predetermined variable, respectively, or adding the height and the width of the shoulder to the predetermined variable.

Further, the value corresponding to the result is less than the predetermined reference value, the controller 250 determines that the physical characteristics of the user are degraded or the user has a weak force. As a result, in the situation of the person who has the weak force, the magnitude of Var_L_Power is increased by 1 (S30). When the user does not have the weak force, the magnitude of Var_H_Power is increased by 1 (S29).

Of course, also in S28, after receiving the image photographed by the artificial intelligence processor in the controller 250, the result of determining whether the user in the image is a weak user based on the result of processing by the artificial intelligence processor.

The controller 250 sets the user group based on comparison of magnitude of Var_H_Power with a magnitude of Var_L_Power generated in the previous process. Current user is set as any one of two or more user groups. Values of H_gain/L_gain in the power assist mode are used accordingly.

Further, even when the user group having the H-Power is set, the controller 250 can increase or decrease H_gain based on the magnitude of Var_H_Power for slight adjustment. Similarly, even when the user group having the L-Power is set, the controller 250 can increase or decrease L_gain based on the magnitude of Var_L_Power for slight adjustment.

That is, the controller 250 rotates the camera sensor 260 or the lens 261 of the camera sensor 260 toward the user when a force is applied to the handle assembly 120 first or the transmission module 500 is used for the first time.

The gender/age/size of body of the user is determined based on analysis of the image in which face or a body shape of the user are photographed. With respect to the gender, as men has a force greater about 1.8 times than the force of women, a greater value of the torque applied to the motor is provided when women pushes the handle assembly 120 compared to a situation in which men pushes the handle assembly 120, so that women can easily push the robot. Alternatively, the controller 250 can further increase the moving speed of the moving part 190.

Likewise, as an elderly portion or a person of small build can have weak force, so that the value of the torque applied to the motor can be increased or the moving speed of the moving part 190 can be increased based on the force to push the handle assembly 120.

Figure 6:
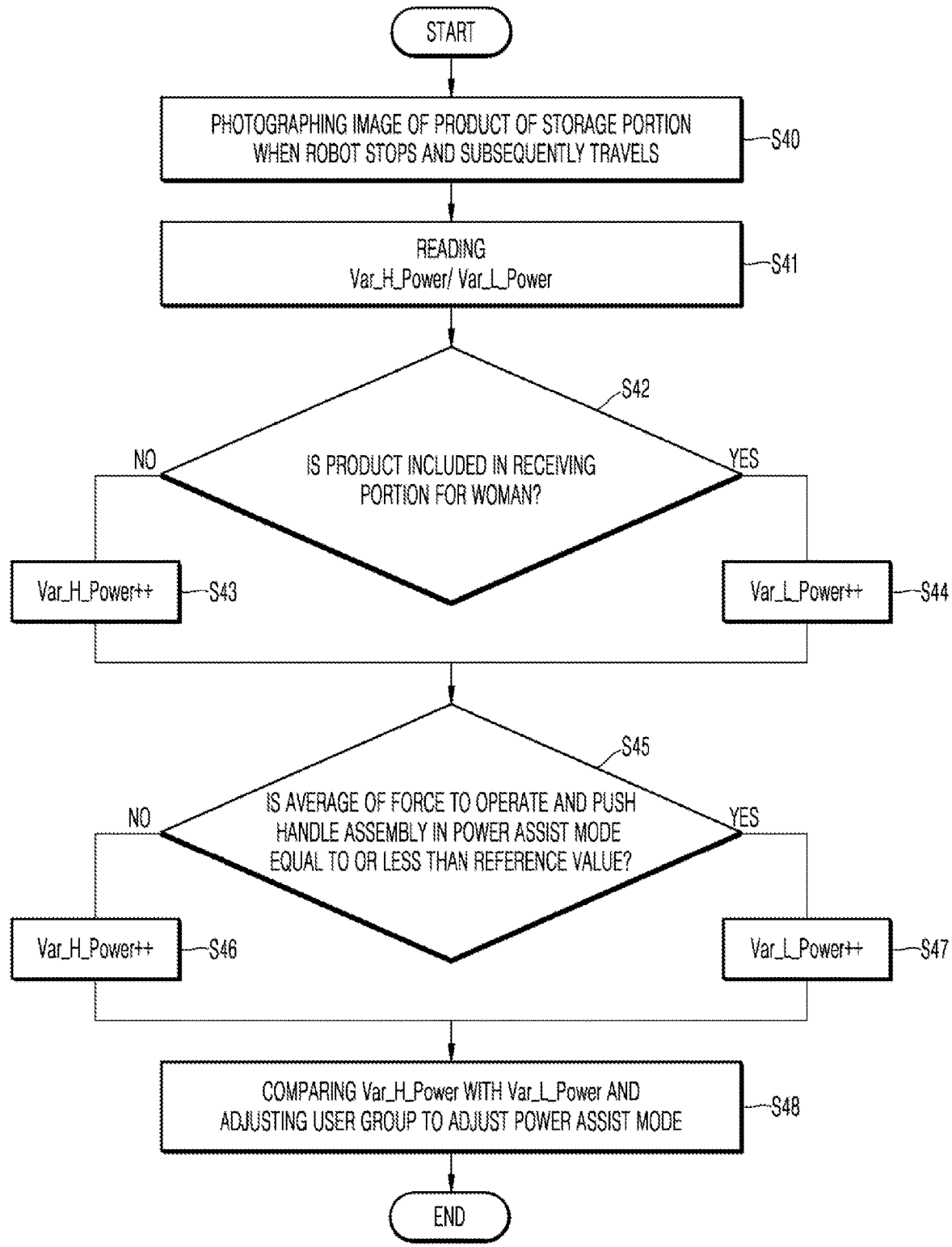
FIG. 6 shows a process of setting a power assist mode suitable for a user based on an image of a receiving portion or operation of a handle assembly of a user according to an embodiment of the present disclosure.

FIG. 6 shows a process of setting a power assist mode suitable for a user based on an image of a receiving portion or operation of a handle assembly, by the user, according to an embodiment of the present disclosure.

When the robot stops and starts driving again, a new article can be included in a receiving portion 110 of the robot. Therefore, the controller 250 rotates a camera sensor 260 that faces a front of the robot 100 to detect the obstacle and photographs an inside of the receiving portion 110 (S40). Thereafter, the controller 250 again controls the camera sensor 260 to face forward.

At this time, the controller 250 can recognize the articles placed in the receiving portion 110 to collect information on a frequency at which a product is selected based on gender/age of the user, and can change information on the gender/age of the user previously determined based on the frequency of selection according to gender/age of the user.

That is, when the product included in the receiving portion 110 is for women (S42), the controller 250 increases a magnitude of Var_L_Power by 1 (S44). When the product is not for women, the magnitude of Var_H_Power is increased by 1 (S43).

In S40 to S45, a camera sensor photographs an image of an article disposed in the receiving portion 110 of the robot 100, and the controller 250 extracts information on the gender of the user from the image of the article to update information on the physical characteristics of the user.

Further, the controller 250 continually senses the force that the user controls the handle assembly during travelling.

That is, the controller 250 continually collects information on the force to push the handle assembly 120 during travelling of the robot. When less magnitude of pushing force is continually provided, H_gain or L_gain can be reduced for each group. Alternatively, when a greater magnitude of the pushing force is continually provided, the H_gain or L_gain can be increased for each group.

Alternatively, the magnitude of the Var_L_Power is increased by 1 when an average of the pushing force to change setting of the user group is less than the reference value. To the contrary, the magnitude of the Var_H_Power is increased by 1 when the average of the pushing force is greater than the reference value. The controller 250 can compare the Var_H_Power with the Var_L_Power to adjust the user group, thereby adjusting the power assist mode (S48).

That is, the controller 250 can accumulate and stores the force applied to the handle assembly to calculate a representative value of the force, and the controller 250 can update the information on the physical characteristics of the user based on the calculated representative value of the force. The representative value of the force can refer to a magnitude of the force applied to the handle assembly during a predetermined unit time. Alternatively, the representative value of the force can refer to a greatest magnitude of the applied force. Alternatively, the values of the forces applied to the handle assembly are sampled in a predetermined unit time. The representative value of the force can be a median value or an average value or a mode of the sampled values of the forces.

The controller 250 calculates the representative value of the force applied to the handle assembly by the user according to a preset standard, and then determines whether the magnitude of the force is equal to or less than the reference value. When it is determined that the force of the user is weak continually, the information on the physical characteristics of the user is updated to have a weak power. On the contrary, when it is determined that the force of the user is strong, the information on the physical characteristics of the user is updated to have a strong force.

As a result of update, the controller 250 can change the group of the user. Alternatively, the controller 250 can change a parameter to convert the magnitude of the force sensed by the force sensor into a moving speed/a value of torque of a motor of the moving part in the power assist mode. In an embodiment, the parameter is an example of the information on the physical characteristics or information included in the information on the physical characteristics.

After the camera sensor 260 completes photographing the receiving portion in S40, the camera sensor 260 can be rotated to face a moving direction of the robot 100, that is, forward. The controller 250 can control the camera sensor 260 to photograph forward to perform a function for avoiding an obstacle or output, to the interface 230, additional information such as a product guide or a direction guide.

Figure 7:
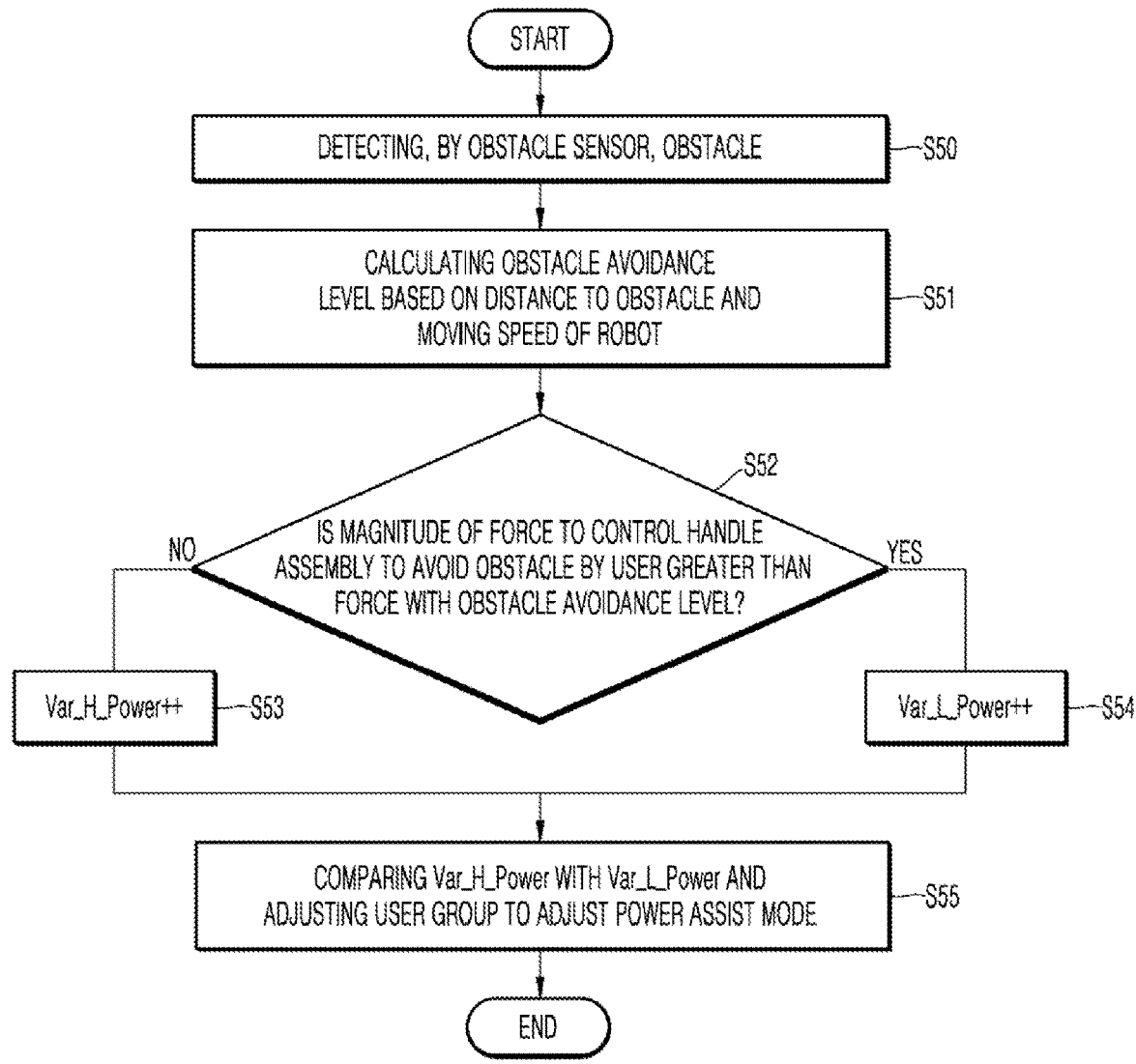
FIG. 7 shows a process of operating, when an obstacle is detected, a handle assembly of a user to set a power assist mode according to an embodiment of the present disclosure.

FIG. 7 shows a process of operating a handle assembly of a user to set a power assist mode when an obstacle is detected according to an embodiment of the present disclosure.

An obstacle sensor 220 detects an obstacle (S50). A controller 250 generates an obstacle avoidance level based on a distance between the obstacle and the robot and a moving speed of the robot (S51). The obstacle avoidance level is set to have a high value when obstacles are placed near the robot or when the robot moves fast.

On the contrary, when obstacles are placed far from the robot or the robot moves slowly, the obstacle avoidance level is set to have a low value. In an embodiment, the obstacle avoidance level is in a range of forces that can be applied to the handle assembly.

For example, the obstacle avoidance level can be inversely proportional to the distance to the obstacle and can be proportional to the moving speed of the robot. Examples of the obstacle avoidance level can include information on a force to be applied to the handle assembly by the user based on the current moving speed of the robot and the distance to the obstacle.

Then, the controller 250 compares the magnitude of the force that the user controls the handle assembly to avoid the obstacle with the obstacle avoidance level (S52), and when the value of the magnitude of the force that the user controls the handle assembly to avoid the obstacle with the obstacle avoidance level is greater, the controller 250 determines that the user controls the robot 100 with a greater magnitude of force to cope with the obstacle. As a result, the magnitude of Var_H_Power is increased by 1 (S53). Alternatively, when the value of the magnitude of the force that the user controls the handle assembly to avoid the obstacle with the obstacle avoidance level is less, the controller 250 determines that the user controls the robot 100 with a less magnitude of force to cope with the obstacle. As a result, the magnitude of Var_L_Power is increased by 1 (S54). Further, the controller 250 can compare the Var_H_Power and the Var_L_Power and can adjust the user group to adjust the power assist mode (S55).

Instead of increasing or decreasing Var_H_Power or Var_L_Power, H_gain or L_gain can be adjusted for each group described above. That is, when the process in FIG. 7 is used, operation of the power assist mode preset for each user can be changed in detail.

When the above-described embodiments are applied, the robot 100 photographs the user, using the camera sensor 260, at an initial time when the robot 100 is used, and then determines the characteristics (gender, age, etc.) of the user, and accordingly, the robot 100 adjusts the setting value in the power assist mode. For example, the set value can be a variable in which the force applied to the handle assembly is substituted with the value of the torque or the moving speed of the motor of the moving part. H_gain/L_gain and the like in Algorithm 1 correspond thereto.

In this process, the controller 250 can extract information on the height and the shoulder width from an image of the user. When the extracted information is compared with information on the height/the shoulder width (reference information) set as default based on the gender of the user, and the controller 250 can lower, when the value corresponding to the extracted information is greater than the value corresponding to the reference information, the setting value accordingly. Alternatively, the extracted information is compared with information on the height/the shoulder width (reference information) set as default based on the gender of the user, and the controller 250 can lower, when the value corresponding to the extracted information is less than the value corresponding to the reference information, the setting value accordingly In the above-described embodiment, the information on the physical characteristics includes a parameter to calculate the moving speed of the moving part 190 or the value of the torque applied to the motor of the moving part 190 in proportional to the magnitude of the force sensed by the force sensor.

For example, the information on the physical characteristics can include information on a group set when the user has a particular gender or age. For example, in the situation of two groups, for example, a strong group and a weak group, the information on the physical characteristics includes information on the group.

Further, the information on the physical characteristics can further include a parameter to convert the magnitude of the force sensed by the force sensor in the above-described algorithm into an electric energy or the value of the torque applied to the moving part. The parameter can include H_gain and L_gain.

Further, the above-described value of the parameter can be continually updated. For example, in FIGS. 5 to 7, Var_H_Power and Var_L_Power can be continually updated in a specific situation, and the controller 250 can update information on the physical characteristics based on the above. As a result, values such as H_gain and L_gain can also be updated.

In summary of FIG. 7, when the obstacle sensor senses an obstacle disposed around the robot, the controller 250 calculates the obstacle avoidance level based on the distance between the sensed obstacle and the robot and the moving speed of the robot.

The controller 250 compares the force of the user applied to the handle assembly with the obstacle avoidance level when the user operates the handle assembly to cope with the obstacle. As a result, when the magnitude of the force applied by the user is greater than a range of the force set by the controller 250 to be applied to the handle assembly at the obstacle avoidance level, the controller 250 updates the information on the physical characteristics and the updated matter is the user having a greater magnitude of force.

Conversely, as a result, when the magnitude of the force applied by the user is less than the range of the force set to be applied to the handle assembly based on the obstacle avoidance level, the controller 250 updates the information on the physical characteristics and the updated matter is that the user is the user who has less magnitude of force.

The controller 250 can store information (unit N) on an average force (such as grip or a pushing force) that the user has for each gender and age, as information on the physical characteristics. The controller can generate, when the gender or age of the user is determined, information on the physical characteristics based on the power shown in Table 3 below.

Subsequently, when the user is stronger or weaker than the following reference, the information on the physical characteristics can be updated. Values in Table 3 below are examples, and the controller 250 of the robot can increase or decrease the values when the update of the information on the physical characteristics occurs repeatedly when the values in Table 3 below are set.

TABLE 3

| AGE | MAN | WOMAN |
| --- | --- | --- |
| 20 s | 430 | 225 |
| 30 s | 425 | 240 |
| 40 s | 410 | 250 |
| 50 s | 380 | 225 |
| 60 s | 375 | 210 |

Of course, further to the grip force, the reference value can be set based on gender/age of the user with respect to the force to push the handle assembly 120 and the power assist mode can be set based on the result of determining the user in the image.

When the characteristics of the gender or the age of the user is not determined, the controller 250 can control the operation the robot in the power assist mode by reflecting the height or shoulder width of the user or by loading a default value.

Figure 8:
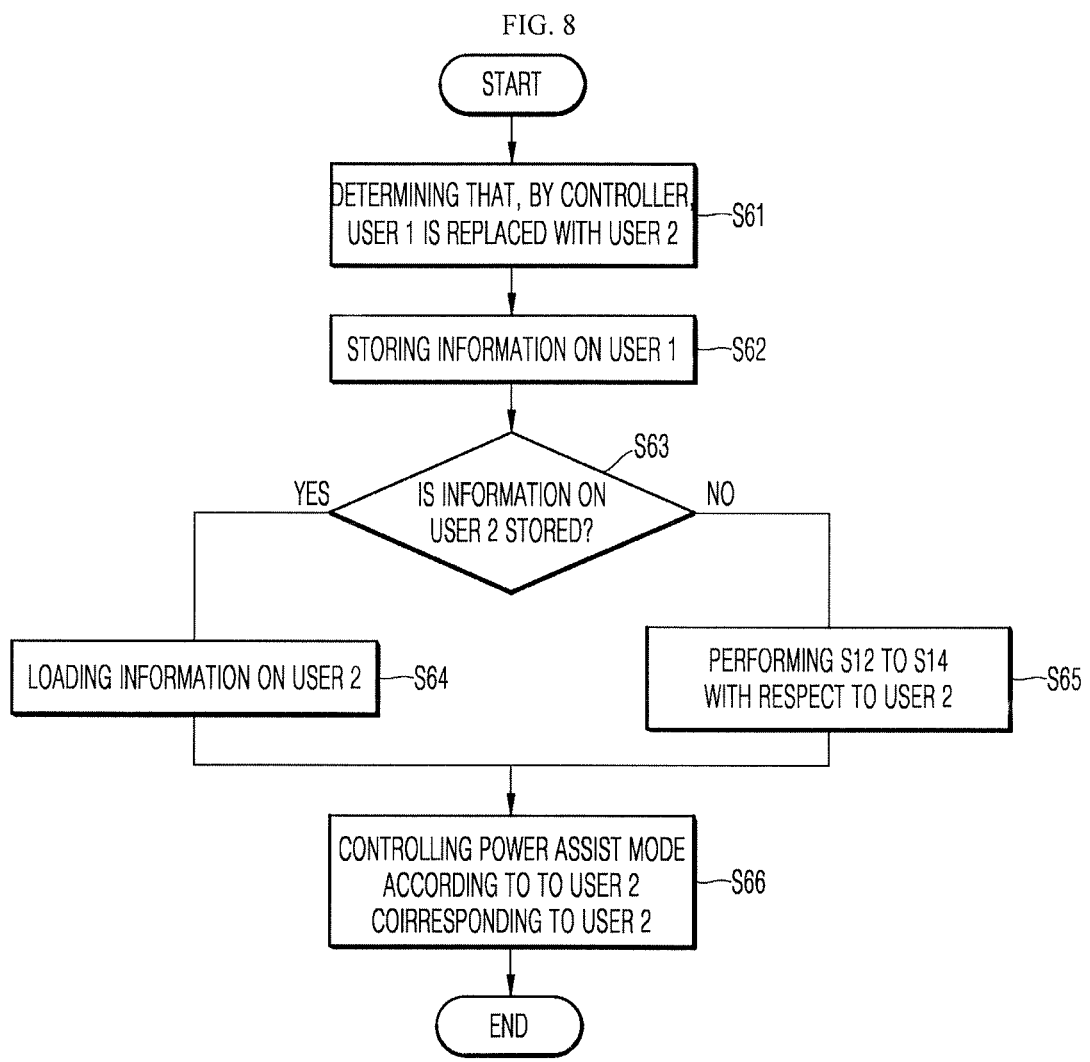
FIG. 8 shows a process in which a robot responds when two or more users alternately control the robot according to an embodiment of the present disclosure.

FIG. 8 shows a process in which a robot responds when two or more users alternately control the robot according to an embodiment of the present disclosure.

A controller periodically rotates a camera sensor 260 toward the user to identify whether the user has been changed (S61). As a result, it is determined that the user has been replaced from user 1 to user 2. However, the controller 250 determines that the robot 100 is not returned.

As a result, the controller 250 determines that the user is temporarily replaced and the user 1 can control the robot 100 again at any time. Therefore, the controller 250 stores information of the user 1 (S62). The information on the user 1 can include a value set in a power assist mode, a height of the user, a width of shoulder of the user, or the clothes worn by the user when the user 1 controls the robot 100.

Then, it is determined whether information on the user 2 is stored (S63). When the user 2 has controlled the robot before the user 1 controls the robot and the setting value in the power assist mode suitable for the user 2 is stored accordingly, the controller 250 loads the information on the user 2 (S64). On the contrary, when the information on the user 2 is not stored, the controller 250 performs the processes of S12 to S14 in FIG. 3 with respect to the user 2 (S65).

As a result, the power assist mode is controlled according to the set group corresponding to the user 2.

In summary, when the robot 100 stops and subsequently moves, the controller 250 controls the camera sensor to photograph the user and determines that the user who controls the robot 100 is replaced based on the photographed image. The controller 250 stores the information on the previous user and subsequently loads the information on a current user or generates the information on the physical characteristics of the current user.

The above operation can be performed repeatedly when the user is replaced. Further, when the use of the robot 100 is completed, the controller 250 can delete all kinds of image information of the user, which is temporarily stored, to respond to new use.

In one embodiment of the present disclosure, the camera sensor 260 of the robot 100 determines characteristics of a user based on the gender or the age and generates the information on the physical characteristics of the user based on the determined feature. The artificial intelligence processor 255 can generate description information based on the photographed image to identify the characteristics of the user based on the photographed image and the controller 250 can determine the gender and the age of the user.

Artificial intelligence refers to a field of studying artificial intelligence or methodology of implementing such artificial intelligence, and machine learning is a field of defining various types of problems which are handled in the field of artificial intelligence and studying methodology of solving the problems. Machine learning is also defined as an algorithm to enhance performance of a certain operation through steady experiences thereof.

An artificial neural network (ANN) is a model which is used in machine learning and can refer to all models having problem solubility which include neurons (nodes) to form a network by coupling to synapses. The ANN can be defined by a connection pattern between neurons of different layers, a learning process of updating model parameters, and an activation function of generating an output value.

The ANN can include an input layer, an output layer, and one or more hidden layers. Each layer includes one or more neurons, and the ANN includes synapses connecting neurons. In the ANN, each neuron outputs input signals which are input from synapses, a weighting value, and a function value of an activation function with respect to deflection.

The model parameters refer to parameters determined through learning and include synapse connection weights, neuron deflections, and the like. In some examples, hyperparameters refer to parameters to be set before learning in a machine learning algorithm and includes a learning rate, the number of repetitions, a minimum placement size, an initialization function, and the like.

The training purpose of ANN can be regarded as determining model parameters to minimize a loss function. The loss function can be used as an index for determining optimal model parameters during learning the ANN.

Machine learning can be classified into supervised learning, unsupervised learning, and reinforcement learning according to learning types.

Supervised learning refers to a learning method of causing the ANN to learn when a label is given to learning data, where a label can refer to a correct answer (or a resultant value) which is to be inferred by the artificial neural network when learning data is input to the ANN. Unsupervised learning refers to a learning method of causing the ANN to learn when a label is not given to learning data. Reinforcement learning refers to a learning method of causing an agent which is defined in a certain environment to learn selection of an action or an action sequence of maximizing cumulative compensation in each state.

Machine learning which is implemented by a deep neural network (DNN) including a plurality of hidden layers is also referred to as "deep learning", and deep learning is a portion of machine learning. In the following description, the machine learning is used as a meaning including deep learning.

In the robot 100, the artificial intelligent processor 255 which is a component included in the controller 250 can perform a function for artificial intelligence. The artificial intelligence processor 255 in the controller 255 can be implemented with software or hardware.

In this situation, the communicator 280 of the robot 100 can transmit and receive data to and from a robot that provides another AI function or external devices such as an AI server 700 which will be described below with reference to FIG. 9 using wired or wireless communication technology. For example, the communicator 280 can transmit and receive sensor information, a user input, a learning model, a control signal, and the like to and from external devices.

Examples of communication technology which is used by the communicator 280 include global system for mobile communication (GSM), code-division multi access (CDMA), long-term evolution (LTE), 5G, wireless LAN (WLAN), wireless-fidelity (Wi-Fi), Bluetooth™, radio frequency identification (RFID), infrared data association (IrDA), ZigBee, and near-field communication (NFC).

The interface 230 acquires various kinds of data.

In this situation, the interface 230 can include a camera that receives an image signal input, a microphone that receives an audio signal, a user input that receives information from a user, and the like. Information acquired by the obstacle sensor 220, the camera sensor 230, or the microphone refers to sensing data, sensor information, and the like.

The interface 230, various types of sensors 220 and 260, and a wheel encoder of the moving part 190 can acquire learning data for model learning, input data to be used for acquiring an output using a learning model. These elements can acquire raw input data. In this situation, the controller 250 or the artificial intelligence can extract input features as a pre-process for input data.

The artificial intelligence processor 255 causes a model including the ANN to learn using learning data. A learned ANN is referred to as "a learning model." The learning model can be used to infer a result value not for the learning data but for new input data, and the inferred value can be used as a determination basis for the robot 100 to perform a certain operation.

Here, the artificial intelligence processor 255 can perform AI processing along with the learning processor 740 of the AI server 700.

The artificial intelligence processor 255 can include a memory incorporated into therobot 100 or implemented within the robot 100. Alternatively, the artificial intelligence processor 255 can be implemented using an independent memory, an external memory coupled to the robot 100, or a memory in an external device.

The robot 100 can acquire at least one of internal information of the robot 100, information on surrounding environment of the robot 100, and user information using various types of sensors.

Examples of the sensors included in the c-robot 100 include a proximity sensor, an illuminance sensor, an acceleration sensor, a magnetic sensor, a gyro sensor, an inertia sensor, an RGB sensor, an IR sensor, a fingerprint recognition sensor, an ultrasonic sensor, an optical sensor, a microphone, a LADAR sensor, an obstacle sensor 220, a camera sensor 260, and a radar.

The interface 230 generates an output associated with a visual sense, an auditory sense, or a haptic sense.

The interface 230 can include a display unit that outputs visual information, a speaker that outputs auditory information, and a haptic module that outputs haptic information.

A memory built in the robot 100 can store data to support various types of functions of the robot 100. For example, the memory can store input data, learning data, learning models, and learning histories which are acquired by various types of sensors and the interface 230 which are built in the robot 100.

The controller 250 can determine at least one executable operation of the robot 100 based on information determined or generated using a data analysis algorithm or a machine learning algorithm. In some examples, the controller 250 can control components of the robot 100 to perform the determined operation.

To this end, the controller 250 can request, retrieve, receive, or utilize data in the artificial intelligence unit or the memory, and can control the elements of the robot 100 to execute a predicted operation or an operation determined as being desirable among the at least one executable operation.

In this situation, when there is a need for connection to an external apparatus in order to perform the determined operation, the controller 250 can generate a control signal for controlling the external apparatus and transmit the generated control signal to the external apparatus.

The controller 250 can acquire intention information from a user input and determine requirements of the user based on the acquired intention information.

The controller 250 can acquire intention information corresponding to a user input using at least one of a speech-to-text (STT) engine to convert a speech input into text or a natural language process (NLP) engine to acquire intention information on a natural language.

At least one of the STT engine or the NLP engine can include the ANN in accordance with a machine learning algorithm. At least one of the STT engine or the NLP engine can be learned by the artificial intelligence and can be learned by the learning process 740 of the AI server 700, or can be learned by distributed processes thereof.

The controller 250 can collect history information including operation details of the robot 100 or feedback of a user which is used for the operation and store the collected history information in the memory or the artificial intelligence or transmit the collected history information to an external device such as the AI server 700. The collected history information can be used to update a learning model.

The controller 250 can control at least a portion of the elements of the robot 100 to execute an application program stored in the memory 170. In addition, the controller 250 can allow two or more of the elements of the robot 100 to operate in combination in order to execute the application program.

Alternatively, an independent artificial intelligence server (an AI server) communicating with the robot 100 can be provided and process information which is provided by the robot 100.

Figure 9:
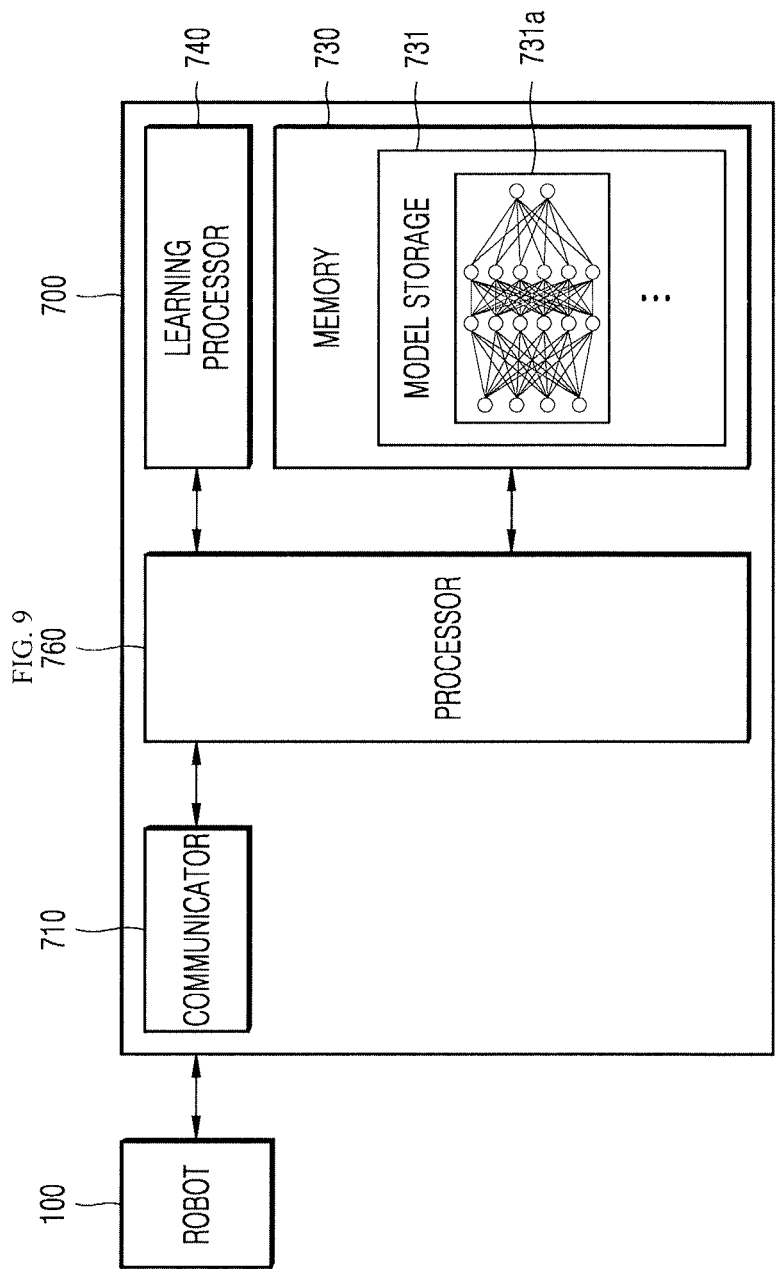
FIG. 9 shows a configuration of an AI server according to an embodiment of the present disclosure.

FIG. 9 shows a configuration of an AI server according to an embodiment of the present disclosure.

An artificial intelligence server, that is, an AI server 700, refers to a device that causes an ANN to learn using a machine learning algorithm or uses a learned ANN. The AI server 700 can include a plurality of servers and perform distributed processing and can be defined as "a 5G network." The AI server 700 is included in an AI device 100 and can perform at least a portion of AI processing together.

The AI server 700 can include a communicator 710, a memory 730, a learning processor 740, and a processor 760.

The communicator 710 can transmit and receive data to and from an external device such as the robot 100.

The memory 730 can include a model storage 731. The model storage 731 can store a model which is learning or learned (or an artificial neural network 731a) via the learning processor 740.

The learning processor 740 causes the artificial neural network 731a to learn using learning data. A learning model can be used when it is mounted in the AI server 700 of the ANN or can be used when it is mounted in an external device such as the robot 100.

A learning model can be implemented within hardware, software, or a combination of hardware and software. When a portion or all of the learning model is implemented within software, one or more instructions included in the learning model can be stored in the memory 730.

The processor 760 can infer a resultant value for new input data using a learning model and can generate a response or a control command based on the inferred resultant value.

In particular, in the present disclosure, the artificial intelligence processor 255 or the AI server 700 can output information on a user with respect to an input image. For example, when a photographed image of a user is input to the artificial intelligence processor 255 or the AI server 700, the artificial intelligence processor 255 or the AI server 700 analyze the image to generate description information on the image.

The description information (description data) shows a person in the image and includes description data such as "woman/man" or "elderly person/student." The controller 250 can generate information on the physical characteristics of the user based on the output information.

Further, further to the above description, the artificial intelligence processor 255 or the AI server 700 can output description information to describe the physical characteristics in more detail, such as "tall woman" or "short man."

FIG. 10 shows a process in which an artificial intelligence processor generates description information on an image after an image is acquired according to an embodiment of the present disclosure.

When a camera 260 acquires an image (S71), a controller 250 performs a feature extraction from the image and calculates a feature vector (S72).

An artificial intelligence processor 255 of a controller 250 can use deep learning, which is a kind of machine learning, and in this process, feature can be extracted using the learning network which is deep learning-based artificial neural network (neural network, artificial neural network (ANN)).

The deep learning is based on data, with a deep level, with multiple steps. The deep learning can refer to a set of machine learning algorithms that can be used to extract key data from a large amount of data, toward higher steps.

The structure of the deep learning can include an artificial neural network (ANN). For example, the structure of the deep learning can include a deep neural network (DNN) such as a convolutional neural network (CNN), a recurrent neural network (RNN), and a deep belief network (DBN) and can be implemented within the artificial intelligence processor 255 or the AI server 700.

Further, the artificial neural network (ANN) can include an input layer, a hidden layer, and an output layer. Each layer includes a plurality of nodes, and each layer is connected to the next layer. Nodes between adjacent layers can have weight and can be connected to each other.

The controller 250 can extract components that are characteristic based on the image, and these components can be included in one vector.

S72 can be performed by an encoder included in the controller 250. The decoder receives a feature vector extracted by the encoder and converts the feature vector into description (S73). The decoder generates an image description to show an image acquired in S71 using the converted description (S74).

That is, the decoder receives the feature vector and generates the image description to analyze the gender or the age or the physical characteristics of the people in the image.

The controller 250 extracts information on the physical characteristics from the image description (S75). The controller 250 reflects the information on the physical characteristics extracted to control the moving part 190 when the robot 100 is in the power assist mode (S76). As described above, the controller 250 can calculate a moving speed of the moving part 190 or a value of the torque of the motor by multiplying a force applied to the handle assembly 120 by a parameter corresponding to predetermined information on the physical characteristics.

An example of the learning network included in the artificial intelligence processor 255 can include recurrent neural network (RNN). The RNN is widely used for natural language processing, and the like, and can have a structure that is effective for processing time-series data that is changed over time and can have a structure of the ANN by stacking layers every time.

An example of the learning network included in the artificial intelligence processor 255 is a deep belief network (DBN). The DBN has a structure of deep learning made by stacking restricted boltzman machine (RBM) that performs a deep learning technique, with many layers. When the learning of restricted boltzman machine (RBM) is repeated and the predetermined numbers of layers are formed, the deep belief network (DBN) that has the number of layers can be provided.

An example of the learning network included in the artificial intelligence processor 255 can include convolutional neural network (CNN) and the CNN is widely used in a field of object recognition. The convolutional neural network (CNN) is a model that simulates a function of brain of a person made based on an assumption that extracts basic features of an object, when a person recognizes an object, and computes complex functions in the brain and recognizes the object based on the result thereof.

In an embodiment, the encoder of the controller 250 can use the CNN among the neural network based on the machine learning.

Further, in an embodiment, the decoder of the controller 250 can use the RNN or the LSTM among the neural network based on the machine learning.

The controller 150 can generate the information on the characteristics of the user based on the description of the image generated by the decoder.

FIG. 10 shows an example of an artificial intelligence processor 255 outputting information on gender or age of a person included in an image. Similarly, the artificial intelligence processor 255 can output a relation of an article included in each image with respect to the gender based on the image of a receiving portion. For example, when the image of the receiving portion 110 is input to the artificial intelligence processor 255, description information on the article can be generated, and accordingly, the controller 250 can estimate the gender of the user based on a degree of relation of each article with respect to gender of the user.

However, the controller 250 can use the relation of the article with respect to the gender of the user only to identify the information on the gender of the user, which is determined in the previous process, or to partially update the information on the physical characteristics.

Although components included in the example implementation of the present disclosure are described as being combined to one, or as being coupled to operate, such implementation is not necessarily limited to this specific example, and these components can be selectively combined to one or more and coupled to operate within the purpose range of the present disclosure. Further, although all of the components can be implemented as an independent hardware, a part or all of each of the components can be selectively combined and implemented as a computer program that has a program module to perform a part or all of the functions combined in one or a plurality of hardware. Codes and code segments that are included in the computer program can be easily deduced by those skilled in the art of the present disclosure. The computer program can be stored in computer readable media that a computer can read, and can be read and implemented by the computer, to implement embodiments of the present disclosure. The storage medium of the computer program can include a storage medium including a semiconductor recording element, an optical recording medium, a magnetic recording medium. Further, the computer program that implements the embodiment of the present disclosure can include a program module that is transmitted in real time through an external device.

While the present disclosure has been mainly described referring to the example implementation of the present disclosure hereinabove, various modifications and changes can be made at the level of those skilled in the art. Therefore, unless such a modification and change do not deviate from the range of the present disclosure, it will understand that they are included in the scope of the present disclosure.

[Description of Reference Numerals]

| | |
|---|---|
| 100: Robot | 110: Receiving portion |
| 120: Handle assembly | 150: Control module |
| 190: Moving part | 210: Positioning sensor |
| 220: Obstacle sensor | 240: Force sensor |
| 250: Controller | 250: Camera sensor |

What is claimed is:

1. A robot comprising:
a cart configured to receive one or more objects;
a camera sensor configured to photograph a periphery of the robot and capture an image of a user of the robot;
a handle assembly coupled to the cart;
a moving part configured to move the robot;
a force sensor configured to sense a force applied to the handle assembly;
an obstacle sensor configured to detect an obstacle disposed around the robot; and
a controller configured to:
generate physical characteristics information on physical characteristics of the user of the robot based on the image of the user, and
adjust at least one of a moving direction of the robot, a moving speed of the moving part and a value of torque applied to a motor of the moving part, based on the physical characteristics information and a magnitude of the force applied to the handle assembly sensed by the force sensor,
wherein the controller is further configured to:
calculate an obstacle avoidance level for the robot based on a distance between the robot and the obstacle detected by the obstacle sensor and a moving speed of the robot, and
update the physical characteristics information of the user based on a comparison of the obstacle avoidance level and the force applied to the handle assembly.

2. The robot of claim 1, wherein the controller is further configured to:
control the camera sensor to capture the image of the user in a direction of the handle assembly when the robot begins to be controlled by the user,
extract gender information on a gender of the user from the image, and
generate the physical characteristics information based on the gender information.

3. The robot of claim 2, wherein the controller is further configured to:
generate height information on a height of the user based on the image and shoulder width information on a shoulder width of the user based on the image, and
update the physical characteristics information of the user based on the height information and the shoulder width information.

4. The robot of claim 2, wherein the controller is further configured to:
extract age information on an age of the user based on the image, and
generate the physical characteristics information of the user based on the age information.

5. The robot of claim 1, wherein the physical characteristics information comprises a parameter to calculate a moving speed of the moving part or a value of the torque, in proportion to the magnitude of the force applied to the handle assembly sensed by the force sensor.

6. The robot of claim 1, wherein the camera sensor is further configured to:
    photograph an image of an article located in a receiving portion of the cart,
    extract gender information on a gender of the user based on the image of the article, and
    update the physical characteristics information of the user based on the gender information.

7. The robot of claim 1, wherein the controller is further configured to:
    accumulatively store the force applied to the handle assembly and calculate a representative value of the force, and
    update the physical characteristics information based on the representative value of the force.

8. The robot of claim 1, wherein the controller is further configured to:
    in response to the robot being stopped and subsequently moved, control the camera sensor to capture another image and determine whether the user is replaced with another user based on the another image, and
    update the physical characteristics information based on a comparison of the obstacle avoidance level and the force applied to the handle assembly or the another image.

9. The robot of claim 1, further comprising:
    an artificial intelligence processor configured to:
        receive the image captured by the camera sensor,
        generate description information of the image, and
        output at least one of gender information on a gender of the user in the image, age information on an age of the user in the image, and relation information based on a relationship between an article in the image and the gender of the user.

10. A method for moving a robot, the method comprising:
    photographing, by a camera sensor of the robot, a periphery of a handle assembly at a time point at which the robot moves and capturing an image of a user of the robot;
    generating, by a controller of the robot, physical characteristics information on physical characteristics of the user of the robot based on the image;
    adjusting, by the controller, at least one of a moving direction of the robot, a moving speed of the moving part and a value of torque applied to a motor of the moving part, based on the physical characteristics information and a magnitude of a force applied to the handle assembly sensed by a force sensor;
    detecting, by an obstacle sensor in the robot, an obstacle disposed around the robot;
    calculating, by the controller, an obstacle avoidance level for the robot based on a distance between the robot and the obstacle detected by the obstacle sensor and a moving speed of the robot; and
    updating, by the controller, the physical characteristics information of the user based on a comparison of the obstacle avoidance level and the force applied to the handle assembly.

11. The method for moving the robot of claim 10, further comprising:
    controlling, by the controller, the camera sensor to capture the image of the user in a direction of the handle assembly when the robot begins to be controlled by the user;
    extracting, by the controller, gender information on a gender of the user from the image; and
    generating, by the controller, the physical characteristics information based on the gender information.

12. The method for moving the robot of claim 11, further comprising:
    generating, by the controller, height information on a height of the user based on the image and shoulder width information on a shoulder width of the user based on the image; and
    updating, by the controller, the physical characteristics information of the user based on the height information and the shoulder width information.

13. The method for moving the robot of claim 11, further comprising:
    extracting, by the controller, age information on an age of the user based on the image; and
    generating, by the controller, the physical characteristics information of the user based on the age information.

14. The method for moving the robot of claim 10, wherein the physical characteristics information comprises a parameter to calculate a moving speed of the moving part or a value of the torque, in proportion to the magnitude of the force applied to the handle assembly sensed by the force sensor.

15. The method for moving the robot of claim 10, the method further comprises:
    photographing, by the camera sensor, an image of an article located in a receiving portion of the robot;
    extracting, by the controller, gender information on a gender of the user based on the image of the article; and
    updating, by the controller, the physical characteristics information of the user based on the gender information.

16. The method for moving the robot of claim 10, the method further comprises:
    accumulatively storing, by the controller, the force applied to the handle assembly and calculating a representative value of the force; and
    updating, by the controller, the physical characteristics information based on the representative value.

17. The method for moving the robot of the user of claim 16, further comprising:
    in response to the robot being stopped and subsequently moved, controlling, by the controller, the camera sensor to capture another image and determine whether the user is replaced with another user based on the another image; and
    updating, by the controller, the physical characteristics information based on a comparison of the obstacle avoidance level and the force applied to the handle assembly or the another image.

18. The method for moving the robot of claim 10, further comprising:
    receiving, by an artificial intelligence processor included in the controller, the image captured by the camera sensor;
    generating, by the artificial intelligence processor, description information of the image; and
    outputting, by the artificial intelligence processor, at least one of gender information on a gender of the user in the image, age information on an age of the user in the image, and relation information based on a relationship between an article in the image and the gender of the user.

* * * * *